(12) United States Patent
Wang

(10) Patent No.: US 8,625,982 B2
(45) Date of Patent: Jan. 7, 2014

(54) HOUSING ASSEMBLY

(75) Inventor: Zhi-Yun Wang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 163 days.

(21) Appl. No.: 13/327,501

(22) Filed: Dec. 15, 2011

(65) Prior Publication Data

US 2013/0039642 A1  Feb. 14, 2013

(30) Foreign Application Priority Data

Aug. 11, 2011  (CN) .......................... 2011 1 0229893

(51) Int. Cl.
*G03B 17/00* (2006.01)
*H04N 5/225* (2006.01)
*H04M 1/00* (2006.01)

(52) U.S. Cl.
USPC ..................... 396/535; 348/373; 455/575.1

(58) Field of Classification Search
USPC ............... 396/535, 429, 448; 348/373, 14.02, 348/552; 455/556.1, 575.1; 359/511
See application file for complete search history.

(56) References Cited

U.S. PATENT DOCUMENTS

2011/0223969 A1* 9/2011 Chou .......................... 455/556.1

* cited by examiner

*Primary Examiner* — Rochelle-Ann J Blackman
(74) *Attorney, Agent, or Firm* — Altis Law Group, Inc.

(57) ABSTRACT

A housing assembly includes a housing, a camera bezel and a retaining structure. The housing includes a plurality of latching elements. The retaining structure is fixed to the camera bezel, the retaining structure including a plurality of retaining elements corresponding to the latching elements. Each retaining element is bent to latch with one of the latching elements so the camera bezel is fixed to the housing.

18 Claims, 5 Drawing Sheets

HOUSING ASSEMBLY

BACKGROUND

1. Technical Field

The disclosure generally relates to housing assemblies, and particularly relates to a housing with a camera bezel.

2. Description of Related Art

Many electronic devices, such as mobile phones, have any one of a variety of camera modules to enable the taking of pictures. A camera module used in an electronic device is received in a housing. The housing has a camera bezel, which functions as a decorative element for attracting consumers and which also functions as a protective member, preventing the camera module from being damaged or soiled. However, it is difficult to firmly fix the camera bezel to the housing with a low profile.

Therefore, there is room for improvement within the art.

BRIEF DESCRIPTION OF THE DRAWINGS

Many aspects of the exemplary housing for portable electronic device can be better understood with reference to the following drawings. These drawings are not necessarily drawn to scale, the emphasis instead being placed upon clearly illustrating the principles of the exemplary housing assembly. Moreover, in the drawings like reference numerals designate corresponding parts throughout the several views. Wherever possible, the same reference numbers are used throughout the drawings to refer to the same or like elements of an embodiment.

DETAILED DESCRIPTION

For illustrative purposes, the device is an electronic device such as a radiotelephone. The radiotelephone described herein is a representation of the type of wireless communication device that may benefit from the present disclosure. However, it is to be understood that the present disclosure may be applied to any type of hand-held or portable device including, but not limited to, the following devices: cordless phones, paging devices, personal digital assistants, portable computers, pen-based or keyboard-based handheld devices, remote control units, portable media players that have wireless communication capability and the like. Accordingly, any reference herein to the radiotelephone should also be considered to apply equally to other portable wireless electronic devices.

Figure 1:
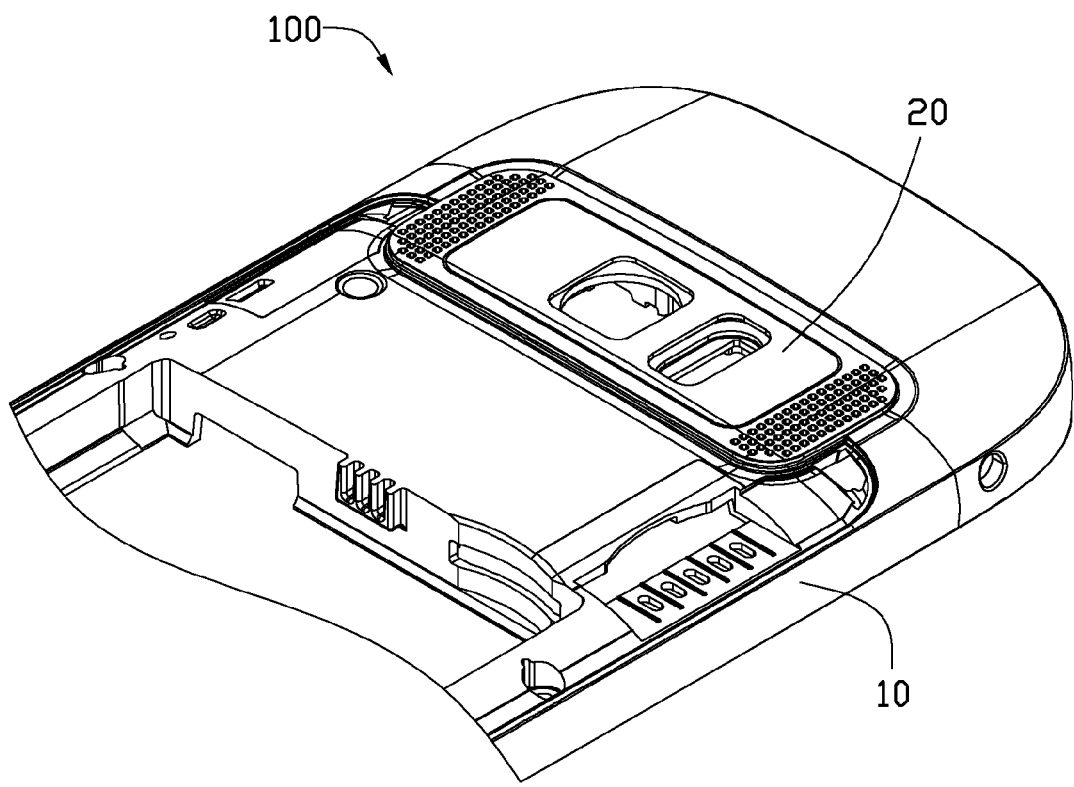
FIG. 1 is a schematic view of a housing assembly according to an exemplary embodiment.
Figure 2:
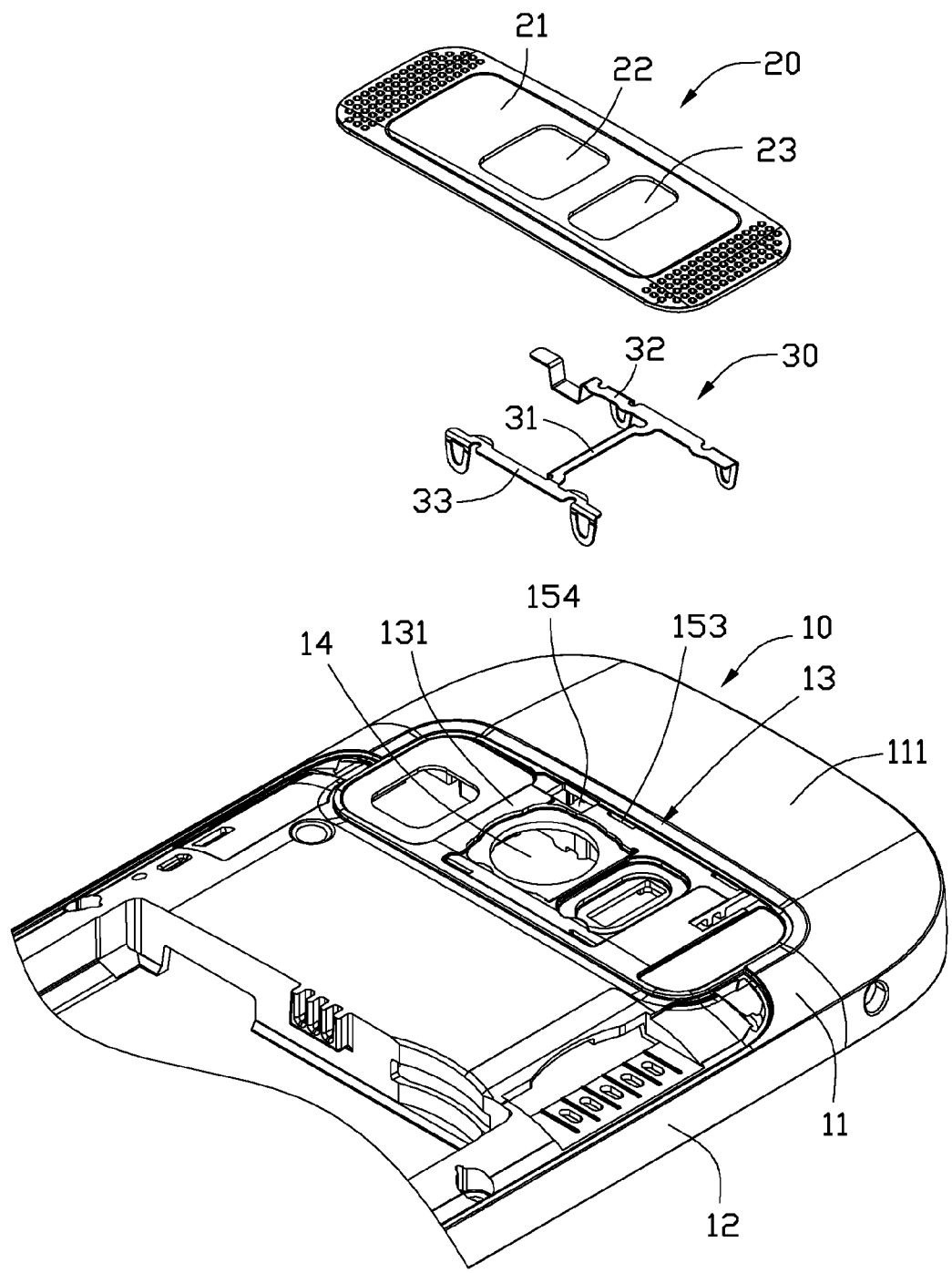
FIG. 2 is an exploded view of the housing assembly of FIG. 1.

An exemplary embodiment of a housing assembly 100 of an electronic device is shown in FIGS. 1 and 2. The housing assembly 100 includes a housing 10, a camera bezel 20 and a retaining structure 30 retaining the camera bezel 20 on the housing 10.

Figure 3:
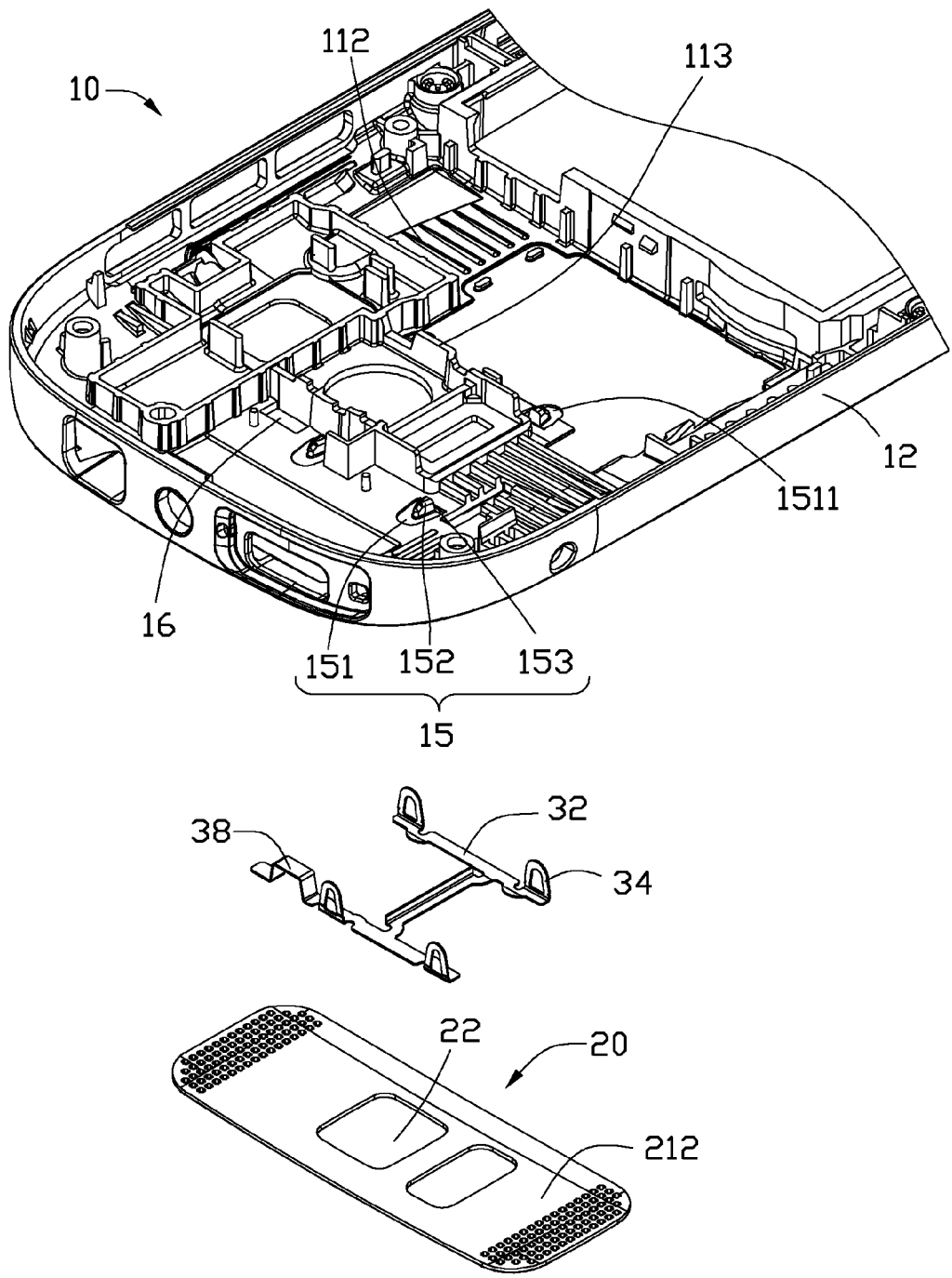
FIG. 3 is another exploded view of the housing assembly of FIG. 1 viewed from another aspect.

Referring to FIG. 3, the housing 10 includes a main panel 11, a peripheral panel 12, a mounting groove 13, a plurality of latching elements 15 and a securing groove 16. The rectangular main panel 11 includes an outer surface 111 and an inner surface 112 opposite to the outer surface 111. The peripheral panel 12 protrudes from the inner surface 112. The mounting groove 13 includes a groove bottom wall 131 defining a light incident hole 14 allowing light to enter into the camera module (not shown). A mounting wall 113 protrudes from the inner surface 112 surrounding the light incident hole 14.

Each latching element 15 includes a receiving groove 151, a latching block 152 located in the receiving groove 151 and defines a channel 153 through the main panel 11 adjacent to the latching block 152. The latching blocks 152 are made of plastic. The channels 153 further communicate with the mounting groove 13. In this exemplary embodiment, the number of the latching elements 15 is four, and each two latching elements 15 are located at one side of the mounting wall 113. The channels 153 are located between the mounting wall 113 and the latching blocks 152. The securing groove 16 is defined through the main panel 11 adjacent to one of the receiving grooves 151, communicating with the mounting groove 13.

The camera bezel 20 is received in the mounting groove 13. The camera bezel 20 includes a main body 21 and a lens 22 fixed to the main body 21 aligning with the light incident hole 14. The camera bezel 20 further includes a reflective mirror 23 adjacent to the lens 22. The main body 21 includes a back surface 212 for fixing the retaining structure 30.

The retaining structure 30 includes a first supporting sheet 32, a second supporting sheet 33 parallel to the first supporting sheet 32, a connecting sheet 31 connecting the center portions of the first supporting sheet 32 and the second supporting sheet 33, and a plurality of retaining elements 34. In this exemplary embodiment, the number of the retaining elements 34 is four, each retaining element 34 is a metal sheet protruding from one end of the first supporting sheet 32 and the second supporting sheet 33.

Figure 4:
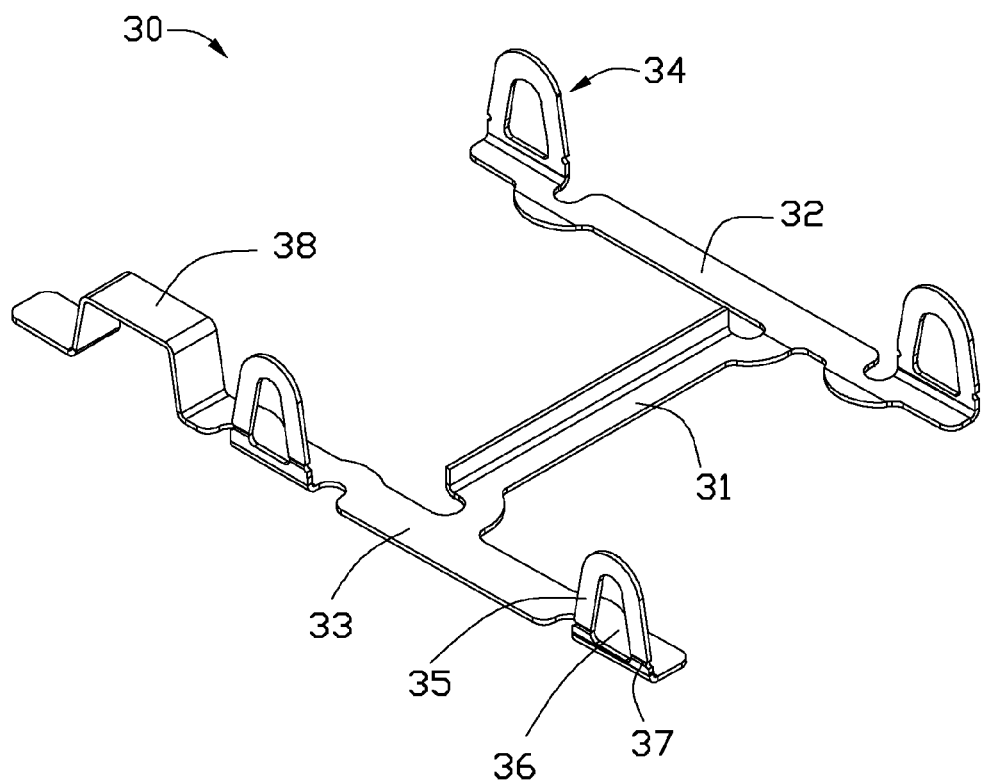
FIG. 4 is an enlarged view of a retaining structure of FIG. 3.

Referring to FIG. 4, each retaining element 34 is retained in one of the receiving grooves 151 and latched with one of the latching blocks 152 so the retaining structure 30 is fixed to the housing 10. Each retaining element 34 includes a contacting surface 35, a retaining hole 36 and two slots 37. Each retaining hole 36 is defined in a center of corresponding contacting surface 35 and latched with one of the latching blocks 152 to fix the retaining structure 30 to the housing 10. Each slot 37 is defined in the corresponding contacting surface 35 and located at two sides of the corresponding retaining hole 36. The slots 37 facilitate the retaining elements 34 to be bent along the slots 37. The retaining structure 30 further defines a positioning protrusion 38 protruding from one end of the second supporting sheet 33, to position the retaining structure 30 to the housing 10.

Figure 5:
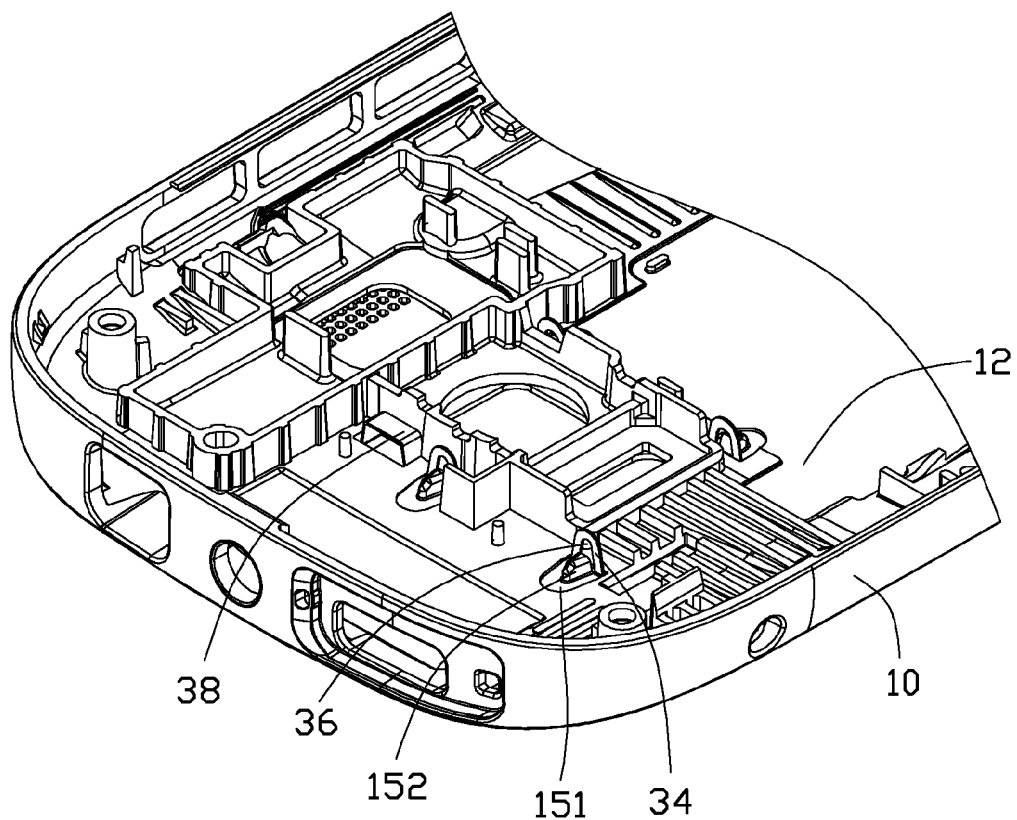
FIG. 5 is an assembled view of the housing assembly of FIG. 3.

Referring to FIG. 5, to fix the camera bezel 20 to the housing 10, the retaining structure 30 is welded to the back surface 212 of the camera bezel 20. The camera bezel 20 is received in the mounting groove 13 with the positioning protrusion 38 positioned in the securing groove 16, and the retaining elements 34 pass through the channels 153. The retaining elements 34 are bent toward the latching blocks 152 to make the latching blocks 152 latch in the retaining holes 36, until the retaining elements 34 are received in the receiving groove 151. At this time, the contacting surfaces 35 contact with the main panel 11. The latching blocks 152 are hot-melted to firmly fix the retaining element in the receiving grooves 151 so the camera bezel 20 is assembled to the housing 10.

It is to be understood, however, that even through numerous characteristics and advantages of the exemplary disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A housing assembly, comprising:
a housing including a plurality of latching elements and a main panel;
a camera bezel;
a retaining structure fixed to the camera bezel, the retaining structure including four retaining elements corresponding to the latching elements, each retaining element being bent to latch with one of the latching elements so the camera bezel is fixed to the housing; each retaining element is a metal sheet defining a retaining hole; each latching element includes a latching block and a channel defining through the main panel adjacent to the latching block; each retaining element passes through one of the channels and is bent to be latched with one of the latching blocks.

2. The housing assembly as claimed in claim 1, wherein each retaining element further defines two slots respectively located two sides of corresponding retaining hole, each retaining element is bent along corresponding slots to be latched in corresponding latching block.

3. The housing assembly as claimed in claim 1, wherein the retaining structure includes a first supporting sheet, a second supporting sheet parallel to the first supporting sheet, and a connecting sheet connecting the first supporting sheet and the second supporting sheet.

4. The housing assembly as claimed in claim 3, wherein each retaining element protrudes from one of ends of the first supporting sheet and the second supporting sheet.

5. The housing assembly as claimed in claim 4, wherein the second supporting sheet protrudes a positioning protrusion, the housing defines a securing groove, the positioning protrusion is secured in the securing groove.

6. The housing assembly as claimed in claim 5, wherein each latching element further defines a receiving groove, corresponding latching block is located in receiving groove; each retaining element is received in the receiving groove.

7. The housing assembly as claimed in claim 6, wherein the main panel includes an outer surface, a mounting groove defined in the outer surface, and an inner surface; the latching element is located in the inner surface; the camera bezel is received in the mounting groove; the channel and the securing groove both communicate with the mounting groove.

8. The housing assembly as claimed in claim 7, wherein the camera bezel includes a lens, the main panel further defines a light incident hole, in which the lens is fixed.

9. A housing assembly, comprising:
a housing including an inner surface, an outer surface and a plurality of latching elements, each latching element including a latching block protruding from the inner surface and a channel defining through the inner surface and the second surface;
a camera bezel mounted on the outer surface;
a retaining structure fixed to the camera bezel, the retaining structure including four retaining elements corresponding to the latching elements, each retaining element passing through one of the channels and being latched with one of the latching elements; wherein each retaining element is a metal sheet defining a retaining hole; each retaining element is bent to be latched with one of the latching blocks.

10. The housing assembly as claimed in claim 9, wherein each retaining element further defines two slots respectively located two sides of corresponding retaining hole, each retaining element is bent along corresponding slots to be latched in corresponding latching block.

11. The housing assembly as claimed in claim 9, wherein the retaining structure includes a first supporting sheet, a second supporting sheet parallel to the first supporting sheet, and a connecting sheet connecting the first supporting sheet and the second supporting sheet.

12. The housing assembly as claimed in claim 11, wherein each retaining element is protruding from one of ends of the first supporting sheet and the second supporting sheet.

13. The housing assembly as claimed in claim 12, wherein the second supporting sheet protrudes a positioning protrusion, the housing defines a securing groove, in which the positioning protrusion is secured.

14. The housing assembly as claimed in claim 13, wherein each latching element further defines a receiving groove, in which corresponding latching block is located; each retaining element is received in the receiving groove.

15. The housing assembly as claimed in claim 14, wherein the housing includes a mounting groove defined in the outer surface, the camera bezel is received in the mounting groove; the channel and the securing groove both communicate with the mounting groove.

16. The housing assembly as claimed in claim 15, wherein the camera bezel includes a lens, the main panel further defines a light incident hole, in which the lens is fixed.

17. A housing assembly, comprising:
a housing including an inner surface, an outer surface and a plurality of latching elements, each latching element including a latching block protruding from the inner surface and a channel defining through the inner surface and the second surface;
a camera bezel mounted on the outer surface;
a retaining structure fixed to the camera bezel, the retaining structure including a plurality of retaining elements corresponding to the latching elements;
wherein the latching block is made of plastic, the retaining elements are made of metal; each retaining element defines a retaining hole; each retaining element passing through one of the channels and then being bent toward one of the latching blocks until each latching block is located in one of the retaining holes; the latching blocks are hot-melted to fix the retaining elements on the latching elements.

18. The housing assembly as claimed in claim 17, wherein each latching element further defines a receiving groove, in which corresponding latching block is located; each retaining element is received in the receiving groove.

* * * * *